United States Patent
Tang et al.

(10) Patent No.: US 12,306,469 B2
(45) Date of Patent: May 20, 2025

(54) ELECTRONIC GLASSES

(71) Applicant: LUXSHARE-ICT CO., LTD., Taipei (TW)

(72) Inventors: Chi-An Tang, Taipei (TW); Pin-Hsun Yu, Taipei (TW); Chen-Yu Chung, Taipei (TW); Ta-Yu Lin, Taipei (TW); Wang-Ting Tsai, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 512 days.

(21) Appl. No.: 17/741,926

(22) Filed: May 11, 2022

(65) Prior Publication Data
US 2022/0269106 A1 Aug. 25, 2022

(30) Foreign Application Priority Data

May 19, 2021 (TW) .................................. 110205756

(51) Int. Cl.
*G02C 5/14* (2006.01)
*G02B 27/01* (2006.01)
*G02C 11/00* (2006.01)

(52) U.S. Cl.
CPC ........... *G02C 5/14* (2013.01); *G02B 27/0176* (2013.01); *G02C 11/10* (2013.01); *G02B 2027/0178* (2013.01)

(58) Field of Classification Search
CPC .......... G02C 5/14; G02C 11/10; G02C 11/06; G02B 27/0176; G02B 2027/0178
USPC ......................................................... 351/158
See application file for complete search history.

(56) References Cited

U.S. PATENT DOCUMENTS

| | | | | |
|---|---|---|---|---|
| 11,852,821 | B2* | 12/2023 | Uhm | H05K 1/02 |
| 11,994,677 | B2* | 5/2024 | Yang | G02B 27/0176 |
| 2019/0212566 | A1* | 7/2019 | Lee | G02C 11/10 |
| 2022/0260832 | A1* | 8/2022 | Yang | G02B 27/0172 |
| 2022/0350559 | A1* | 11/2022 | Yoon | G06F 3/1423 |
| 2023/0083895 | A1* | 3/2023 | Uhm | G02B 27/0176 345/8 |
| 2024/0103300 | A1* | 3/2024 | Kubota | G02C 5/146 |

FOREIGN PATENT DOCUMENTS

| | | |
|---|---|---|
| CN | 211698479 U | 10/2020 |
| CN | 212569335 U | 2/2021 |

* cited by examiner

*Primary Examiner* — William R Alexander
(74) *Attorney, Agent, or Firm* — Birch, Stewart, Kolasch & Birch, LLP

(57) ABSTRACT

An electronic glasses includes a lens frame, a first temple, a second temple, an electronic device and an audio I/O device. The Hall sensor is disposed at one of the lens frame, the first temple, and the second temple. The audio I/O device is disposed at another of the lens frame, the first temple and the second temple, and provided with a magnetic element. The Hall sensor provides a first signal for the electronic device when the first temple and/or the second temple are folded to make the Hall sensor and the audio I/O device close to each other, and the Hall sensor provides a second signal for the electronic device when the first temple or the second temple are unfolded to make the Hall sensor and the audio I/O device be away from each other.

11 Claims, 3 Drawing Sheets

ELECTRONIC GLASSES

CROSS-REFERENCE TO RELATED APPLICATION

This non-provisional application claims priority under 35 U.S.C. § 119(a) to Patent Application No. 110205756 filed in Taiwan, R.O.C. on May 19, 2021, the entire contents of which are hereby incorporated by reference.

BACKGROUND

Technical Field

The present disclosure is generally related to the field of electronics, and especially related to a kind of electronic glasses.

Related Art

The key factors of an electronic device acceptable for consumer include portability, long-lasting power, and product life cycle. Although there are several commercialized smart glasses, the user is so reluctant to adopt them in consideration of limited space and battery capacity. The smart glasses sold in the market can only last for about 16 hours and even much less with long-term photography or map information display. As a result, the conventional smart glasses would run out of battery for significantly shorter time period and reduce consumer's willingness to purchase them.

Moreover, most of the smart glasses relies on physical buttons to turn on and off. Once if the customer forgets turning off the device, it will cause undue power consumption and may further deteriorate battery lifetime.

SUMMARY

To resolve the previously mentioned issue, the present disclosure sets forth an electronic glasses includes a lens frame, a first temple, a second frame part, an electronic device, a Hall sensor, and an audio output/input device.

The lens frame has a first side and a second side. The first temple is connected to the first side of the lens frame through a first hinge. The second temple is connected to the second side of the lens frame through a second hinge. The electronic device is disposed at the lens frame, the first temple, or the second temple. The Hall sensor is disposed at one of the lens frame, the first temple, and the second temple and electrically connected to the electronic device. The audio I/O device is disposed at another of the lens frame, the first temple and the second temple, and provided with a vibrating element and a magnetic element associated with the vibrating element. The Hall sensor provides a first signal for the electronic device when the first temple and/or the second temple are folded to make the Hall sensor and the audio I/O device close to each other, and the Hall sensor provides a second signal for the electronic device when the first temple or the second temple are unfolded to make the Hall sensor and the audio I/O device be away from each other.

In some embodiments, the first temple has a first elongated piece connected to the first side of the lens frame through the first hinge and a first tip piece extendedly bent from the first elongated piece. The second temple has a second elongated piece connected to the second side of the lens frame through the second hinge and a second tip piece extendedly bent from the second elongated piece. In addition, one of the Hall sensor and the audio I/O device is disposed in the first elongated piece or the second elongated piece and another of the Hall sensor and the audio I/O device is disposed in the lens frame, the first tip piece or the second tip piece when the first temple and the second temple are folded to make portions of the first elongated piece and the second tip piece overlapped and make portions of the second elongated piece and the first tip piece overlapped.

Moreover, an audio hole is positioned at the first tip piece or the second tip piece if the Hall sensor is disposed in the first elongated piece or the second elongated piece and the audio I/O device is disposed in the first tip piece or the second tip piece.

Further, the audio I/O device has a speaker or a microphone, the vibrating element is a diaphragm, the magnetic element is a magnet, and the diaphragm is disposed between the audio hole and the magnet.

In some embodiments, the electronic device comprises an image capturing module and power unit, the image capturing module comprises a camera unit and a storage unit for storing image data captured by the camera unit, and the power unit supplies power to the image capturing module and is electrically connected to the Hall sensor and the audio I/O device.

Moreover, the electronic device further comprises a signal transceiver module electrically connected to the image capturing module. Furthermore, the signal transceiver module is selected from a group consisting of Bluetooth, WiFi, 4G/5G chips.

In some embodiments, the electronic glasses further comprise a display lens. The electronic device comprises signal transceiver module and a power unit. The display lens is disposed in lens frame and electrically connected to the signal transceiver module for displaying the signals received by the signal transceiver module. The power unit supplies power to the display lens and the signal transceiver module In more detail, the electronic device further comprises a touch button electrically connected to the display lens and the power unit, wherein the touch button generates control signal to change the image displayed on the display lens in response a user touch.

Furthermore, the electronic device further includes a camera unit. The camera unit is electrically connected to the display lens in some embodiments, the power supply unit, the touch button, and the signal transceiver module. The touch button controls the operation of the camera unit with the control signal, and the image displayed by the lens is displayed. The signal transceiver module wirelessly transmits the image captured by the camera unit.

In more detail, the electronic device further comprises a camera unit electrically connected to the display lens, the power unit, the touch button and the signal transceiver module, wherein the touch button controls the operation of the camera unit and the image displayed on the display lens, and the signal transceiver module transmits image data provided by the camera unit in a wireless manner.

As a result, electronic glasses use Hall sensor and magnet disposed inside the audio input/output device to generate the corresponding signals when the first temple and the second temple are folded or unfolded, so the electronic device can perform related actions such as it can automatically turn off the induction magnetic field when it is folded, to save power and save energy and extend the lifetime of the product. Moreover, since the audio input/output device are a component that electronic glasses need to achieve the audio input or audio output function, the audio input/output device is combined with the Hall sensor to achieve the above function. As a result, there is no need to add additional magnet to cooperate with the Hall sensor, which effectively reduces weight, reduces space occupation and costs.

Detailed description of the characteristics and the advantages of the present disclosure are shown in the following embodiments. The technical content and the implementation of the present disclosure should be readily apparent to any person skilled in the art from the detailed description, and the purposes and the advantages of the present disclosure should be readily understood by any person skilled in the art with reference to content, claims, and drawings in the present disclosure.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
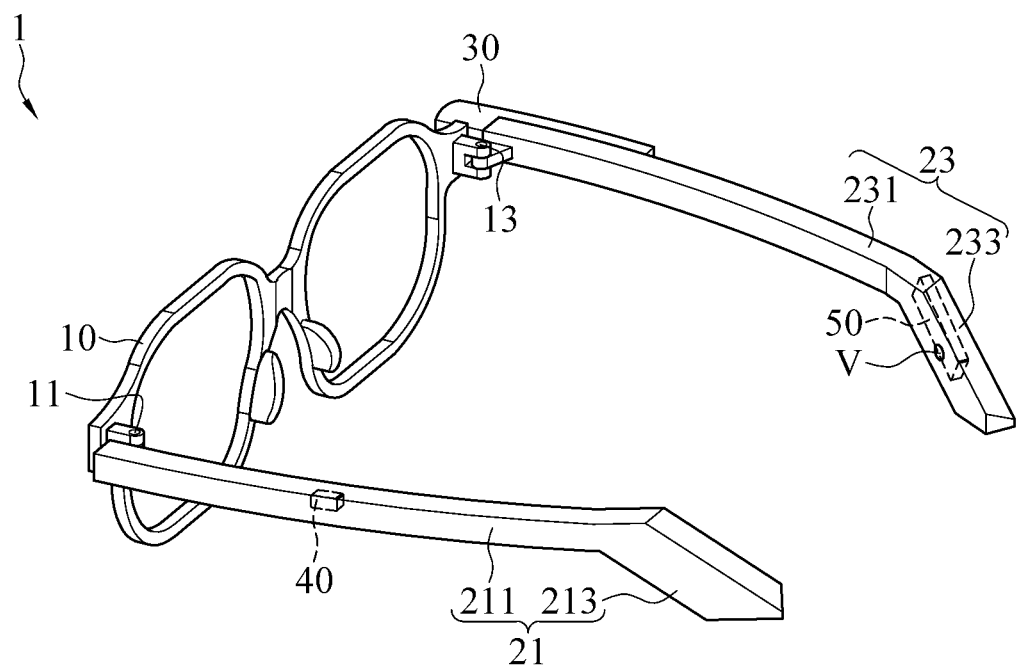
FIG. 1 is a perspective view of electronic glasses in accordance with one preferred embodiment of the present disclosure under a first state.
Figure 2:
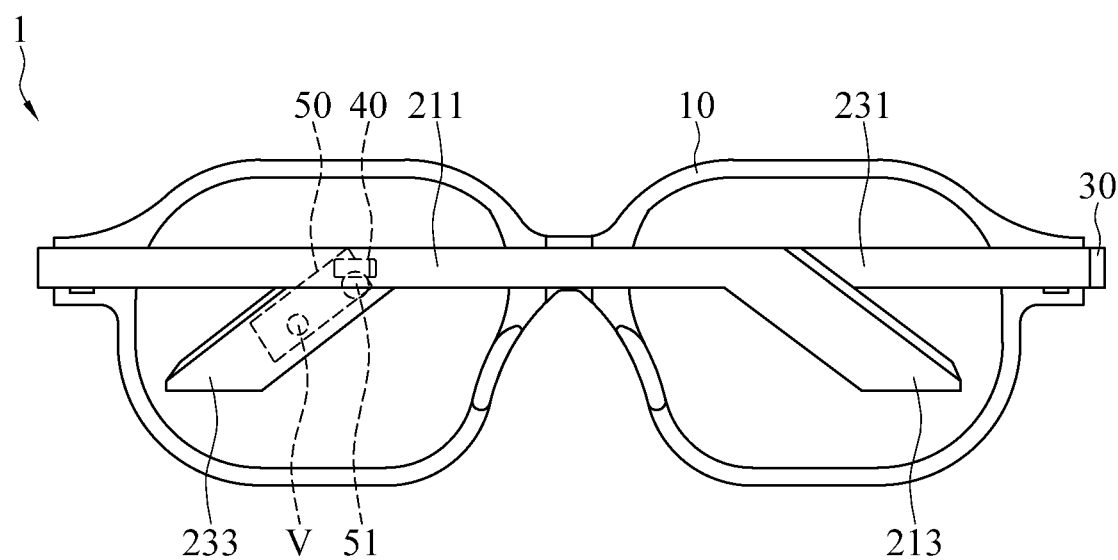
FIG. 2 is a rear view of FIG. 1 under a second state.

FIG. 1 is a perspective view of electronic glasses 1 in accordance with one preferred embodiment of the present disclosure under a first state. FIG. 2 is a rear view of FIG. 1 under a second state. As shown in FIGS. 1 and 2, the electronic glasses 1 includes a lens frame 10, a first temple 21, a second temple 23, an electronic device 30, a Hall sensor 40, and an audio input/output (I/O) device 50.

The first temple 21 includes a first elongated piece 211 and a first tip piece 213. The first elongated piece 211 is connected to the first side of the lens frame 10 through a first hinge 11, and the first tip piece 213 is extendedly bent from the first elongated piece 211. The second temple 23 includes a second elongated piece 231 and a second tip piece 233. The second elongated piece 231 is connected to the second side of the lens frame 10 through a second hinge 13, and the second tip piece 233 is extendedly bent from the second elongated piece 231.

As shown in FIG. 2, when the first temple 21 and the second temple 23 are folded together and approach to the inner side of the lens frame 10, a portion of the first elongated piece 211 and a portion of the second tip piece 233 are overlapped, and a portion of the second elongated piece 231 and a portion of the first tip piece 213 are also overlapped.

As shown in FIGS. 1 and 2, the electronic device 30 is disposed on the lens frame 1 and a portion of the second temple 23, which can be lens for capturing images, but it is merely an example and not a limitation to the scope of the present disclosure. In fact, electronic device 30 can be installed on the lens frame 10, the first temple 21 or the second temple 23. In other words, the electronic device 30 can be separately arranged on the lens frame 10, the first temple 21 or the second temple 23. Furthermore, the electronic device 30 can be simultaneously disposed on the lens frame 10 and the first temple 21, or simultaneously disposed on the lens frame 10 and the second temple 23.

In some embodiments, the Hall sensor 40 can be installed in one of the lens frame 10, the first temple 21 and the second temple 23. The audio input/output device 50 can be installed in the other of the lens frame 10, the first temple 21 and the second temple 23. As an example, one of the Hall sensor 40 and the audio input/output device 50 can be installed in the first side of the lens frame 10 and the other of the Hall sensor 40 and the audio input/output device 50 can be installed in the elongated piece 211 of the first temple 21 but close to the lens frame 10. When the first temple 21 is folded, the Hall sensor 40 and the audio input/output device 50 can be close to each other. When the first temple 21 is unfolded, the Hall sensor 40 and the audio input/output device 50 are away from each other. Alternatively, one of the Hall sensor 40 and the audio input/output device 50 can be installed in the first side of the lens frame 10 and the other of the Hall sensor 40 and the audio input/output device 50 can be installed in the second tip piece 233 of the second temple 23 but far away from the lens frame 10. When the second temple 23 is folded, the Hall sensor 40 and the audio input/output device 50 is close to each other. When the first temple 21 is unfolded, the Hall sensor 40 and the audio input/output device 50 are away from each other. In some embodiments, one of the Hall sensor 40 and the audio input/output device 50 can be installed in the first elongated piece 211 or the second elongated piece 231, and the other of the Hall sensor 40 and the audio input/output device 50, and the other of the Hall sensor 40 and the audio input/ output device 50 can be correspondingly installed in the lens frame 10, the first tip piece 213 or the second tip piece 233.

In some embodiments, as shown in FIGS. 1 and 2, the Hall sensor 40 is installed in the first elongated piece 211 and is electronically connected to the electronic device 30. However, the Hall sensor 40 can also be installed in the second elongated piece 231. The audio input/output device 50 may be a speaker or a microphone, which includes a vibrating element and a magnetic element arranged corresponding to the vibrating element. The vibrating element is, for example, a diaphragm, which is connected to an audio coil. The magnetic element is, for example, a magnet 51 for vibrating the audio coil. In FIGS. 1 and 2, the audio input/output device 50 is disposed at the second tip piece 233. In some embodiments, if the Hall sensor 40 is installed on the second elongated piece 231, the audio input/output device 50 is correspondingly installed on the first tip piece 213. In some embodiments, two Hall sensors 40 may be provided on the first elongated piece 211 and the second elongated piece 231, and two audio input/output devices 50 may be provided on the first tip piece 213 and the second tip piece 233. As shown in FIG. 2, when the first temple 21 and the second temple 23 are folded, the Hall sensor 40 and the audio input/output device 50 are overlapped. The Hall sensor 40 and the magnetic element of the audio input/ output device 50 are configured to correspond to each other. Additionally, the Hall sensor 40 and the magnet 51 of the audio input/output device 50 are configured to correspond to each other. There is no need of installing additional and specific magnetic unit only for the Hall sensor. Accordingly, the Hall sensor 40 and the audio input/output device 50 are close to each other such that the Hall sensor 40 is triggered by the magnetic force generated by the magnet 51 to generate a first signal and transmit the first signal to the electronic device 30. Accordingly, the electronic device 30 performs corresponding actions in response to the first signal, such as but not limited to a shutdown signal. The shutdown signal is used to turn off the electronic device 30. For example, the electronic device 30 will automatically enter the shutdown mode or the power saving mode after receiving the shutdown signal. As shown in FIG. 1, when the first temple 21 or the second temple 23 is unfolded so that the Hall sensor 40 and the audio input/output device 50 are not overlapped, the Hall sensor 40 generates a second signal and transmits the second signal to the electronic device 30. Accordingly, the electronic device 30 performs corresponding actions in response to the second signal, such as but not limited to a turn-on signal. The turn-on signal is used to turn on the electronic device 30. For example, the electronic device 30 will automatically power on or return to an operating mode from the power-saving mode.

Refer to the FIGS. 1 and 2 again, the first temple 21 and the second temple 23 are hollow elements, and the Hall sensor 40 is mounted inside the first elongated piece 211 or the second elongated piece 231. However, this is merely an example. In fact, it can also be embedded or installed on the surface of the first elongated piece 211 or the second elongated piece 231.

In addition, the audio input/output device 50 is disposed in the second tip piece 233 or the first tip piece 213, and the second tip piece 233 or the first tip piece 213 is provided with a sound hole V to transmit audio. The diaphragm of the audio input/output device 50 is located between the sound hole V and the magnet 51.

Figure 3:
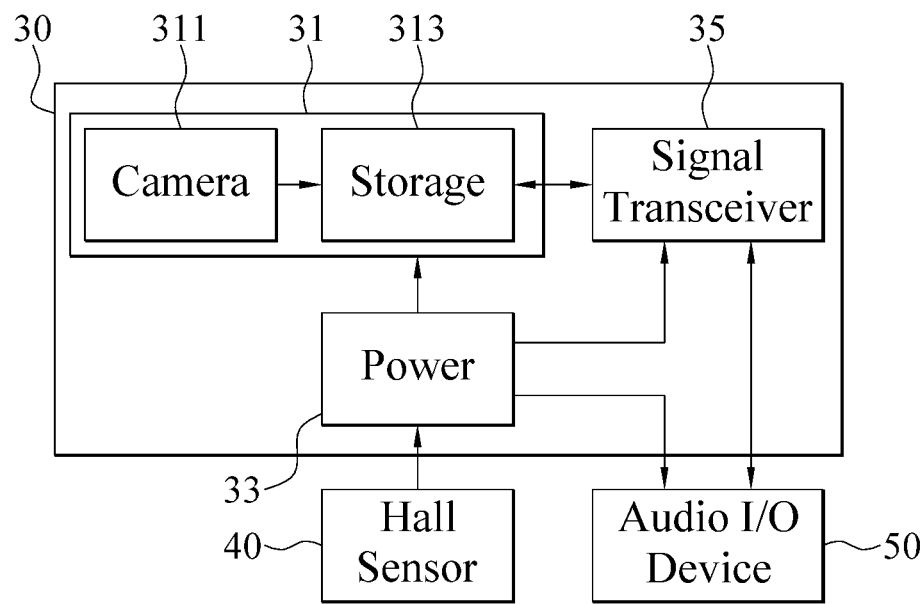
FIG. 3 is a block diagram of FIG. 1.

FIG. 3 is a block diagram of an embodiment of electronic glasses. As shown in FIG. 3, the electronic device 30 includes an image capturing module 31 and a power unit 33. The image capturing module 31 includes a camera unit 311 and a storage unit 313. The storage unit 313 stores the image data captured by the camera unit 311. The power unit 33 supplies power to the image capturing module 31 and it is electrically connected to the Hall sensor 40 and the audio input/output device 50. As such, when the Hall sensor 40 and the audio input/output device 50 are overlapped or non-overlapped, the power unit 33 can be turned off or turned on respectively, and then the image capturing module 31 can be turned off or turned on accordingly. Therefore, the operation of the electronic glasses 1 is quite similar to that of a driving recorder.

Furthermore, the electronic device 30 further includes a signal transceiver model 35, which is electrically connected to the image capturing module 31, and the signal transceiver model 35 can transmit the image data captured by the image capturing module 31 in a wired or wireless manner. Thus, the captured image data can be transmitted, for example, to a mobile phone or the cloud device. Furthermore, the signal transceiver model 35 can also be electrically connected to the audio input/output device 50, and therefore the audio I/O device 50 can also receive audio signals from a mobile phone connected to the signal transceiver module 35 and play them. In more detail, the signal transceiver module 35 is selected from a group consisting of Bluetooth communication chip, WIFI communication chip, and 4G/5G communication chip in some embodiments. The signal transceiver module 35 is suitable for at least one of Bluetooth communication, WIFI communication, or 4G/5G communication.

Figure 4:
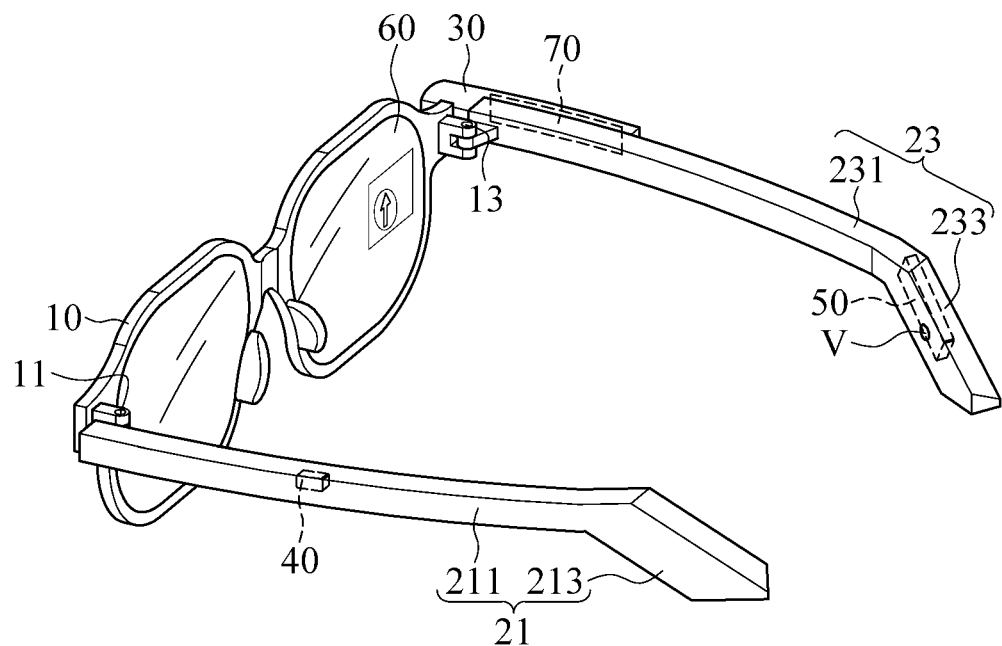
FIG. 4 is a perspective view of electronic glasses in accordance with another preferred embodiment of the present disclosure.
Figure 5:
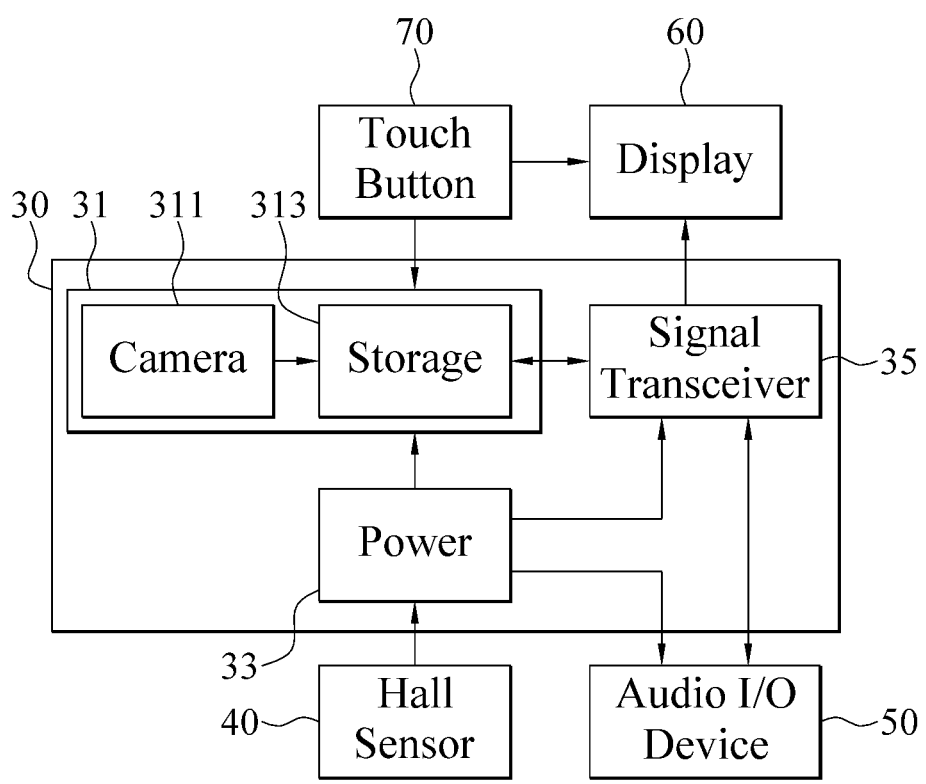
FIG. 5 is a block diagram of FIG. 4.

FIG. 4 is a perspective view of electronic glasses in accordance with another embodiment of the present disclosure. FIG. 5 is a block diagram of FIG. 4. As shown in FIGS. 4 and 5, the electronic glasses 1 further includes a display lens 60. The electronic device 30 includes a signal transceiver model 35 and a power unit 33. The display lens 60 is installed in the lens frame 10 and is electrically connected to the signal transceiver model 35 to display signals received from the signal transceiver model 35. The power unit 33 supplies the required power for the display lens 60 and the signal transceiver module 35.

The signal transceiver module 35 may include a Bluetooth and/or WIFI chip to wirelessly receive signals, such as from a mobile phone or a tablet computer wirelessly communicated with the electronic glasses 1 in order to display them on the display lens 60. For example, the display lens 60 can display navigation image. In this way, the electronic glasses 1 can be used as an extended auxiliary display of a mobile phone or a tablet computer.

Furthermore, the electronic glasses 1 includes a touch button 70 which is electrically connected to the display lens 60 and the power unit 33. The touch button 70 generates a control signal through a user touch to change the screen displayed by the display lens 60.

Referring to FIG. 5 again, the electronic device 30 further comprises the camera unit 311 which is electrically connected to the display lens 60, the power unit 33, the touch button 70, and the signal transceiver module 35. The touch button 70 is used to generate the control signal for controlling the operation of the camera unit 311 and also the screen displayed on the display lens 60. The signal transceiver model 35 wirelessly transmits the image data captured by the camera unit 311. In addition, the electronic device 30 may also include the storage unit 313 as shown in FIG. 3, and together with the camera unit 311 constitute the image capturing module 31.

The signal transceiver module 35 can also be electrically connected to the audio input/output device 50 by replacing the touch button 70 with a voice control chip in some embodiments.

According to the present disclosure, the electronic glasses 1 use the Hall sensor 40 and the magnet 51 inside the audio input/output device 50 to generate the corresponding signals while the first temple 21 and the second temple 23 are folded or unfolded. Therefore, the electronic device performs corresponding actions in response to the corresponding signals. For example, the electronic device can be automatically turned off by the induced magnetic field when the two temples are folded, to enter power saving mode and prolongs the time period for usage. Moreover, since the audio input/output device 50 is a component required by the electronic glasses 1 to achieve the audio input or audio output function, the audio input/output device 50 cooperates with the Hall sensor 40 to achieve the above function. No additional magnet is required so as to reduce weight, accommodation space, and cost as well.

As above, when one element is referred to as being "connected" or "disposed" to another element, it means that the one element is directly on the other element or means that the one element is indirectly connected or disposed to the other element through an intermediate element. On the contrary, when an element is referred to as being "directly on another element" or "directly connected to another element," it can be understood that no intermediate element is required.

While the present disclosure has been described by way of example and in terms of the preferred embodiments, it is to be understood that the present disclosure needs not be limited to the disclosed embodiments. For anyone skilled in the art, various modifications and improvements within the spirit of the present disclosure are covered under the scope of the present disclosure. The covered scope of the present disclosure is based on the appended claims.

What is claimed is:

1. An electronic glasses, comprising:
   a lens frame having a first side and a second side;

a first temple connected to the first side of the lens frame through a first hinge;

a second temple connected to the second side of the lens frame through a second hinge;

an electronic device disposed at the lens frame, the first temple, or the second temple;

a Hall sensor disposed at one of the lens frame, the first temple, and the second temple and electrically connected to the electronic device; and an audio I/O device disposed at another of the lens frame, the first temple and the second temple, and provided with a vibrating element and a magnetic element associated with the vibrating element;

wherein the Hall sensor provides a first signal for the electronic device when the first temple and/or the second temple are folded to make the Hall sensor and the audio I/O device close to each other, and the Hall sensor provides a second signal for the electronic device when the first temple or the second temple are unfolded to make the Hall sensor and the audio I/O device be away from each other, wherein the first temple has a first elongated piece connected to the first side of the lens frame through the first hinge and a first tip piece extendedly bent from the first elongated piece; the second temple has a second elongated piece connected to the second side of the lens frame through the second hinge and a second tip piece extendedly bent from the second elongated piece; and, one of the Hall sensor and the audio I/O device is disposed in the first elongated piece or the second elongated piece and another of the Hall sensor and the audio I/O device is disposed in the lens frame, the first tip piece or the second tip piece when the first temple and the second temple are folded to make portions of the first elongated piece and the second tip piece overlapped and make portions of the second elongated piece and the first tip piece overlapped.

2. The electronic glasses according to claim 1, wherein the first tip piece or the second tip piece is provided with an audio hole while the Hall sensor is disposed in the first elongated piece or the second elongated piece and the audio I/O device is disposed in the first tip piece or the second tip piece.

3. The electronic glasses according to claim 2, wherein the audio I/O device has a speaker or a microphone, the vibrating element is a diaphragm, the magnetic element is a magnet, and the diaphragm is disposed between the audio hole and the magnet.

4. The electronic glasses according to claim 3, the Hall sensor and the magnet of the audio I/O device are configured to correspond to each other.

5. The electronic glasses according to claim 1, the Hall sensor and the magnetic element of the audio I/O device are configured to correspond to each other.

6. The electronic glasses according to claim 1, wherein the electronic device comprises an image capturing module and a power unit, the image capturing module comprises a camera unit and a storage unit for storing image data captured by the camera unit, and the power unit supplies power to the image capturing module and is electrically connected to the Hall sensor and the audio I/O device.

7. The electronic glasses according to claim 6, wherein the electronic device further comprises a signal transceiver module electrically connected to the image capturing module.

8. The electronic glasses according to claim 7, wherein signal transceiver module is selected from a group consisting of Bluetooth, WiFi, 4G/5G chips.

9. The electronic glasses according to claim 1, further comprising a display lens; wherein the electronic device comprises a signal transceiver module and a power unit; wherein the display lens is disposed in the lens frame and electrically connected to the signal transceiver module for displaying signals received by the signal transceiver module; wherein the power unit supplies power to the display lens and the signal transceiver module.

10. The electronic glasses according to claim 9, wherein the electronic device further comprises a touch button electrically connected to the display lens and the power unit, wherein the touch button generates control signal to change the image displayed on the display lens in response a user touch.

11. An electronic glasses, comprising:

a lens frame having a first side and a second side;

a first temple connected to the first side of the lens frame through a first hinge;

a second temple connected to the second side of the lens frame through a second hinge;

an electronic device disposed at the lens frame, the first temple, or the second temple;

a Hall sensor disposed at one of the lens frame, the first temple, and the second temple and electrically connected to the electronic device;

an audio I/O device disposed at another of the lens frame, the first temple and the second temple, and provided with a vibrating element and a magnetic element associated with the vibrating element; and a display lens; wherein the electronic device comprises a signal transceiver module and a power unit; wherein the display lens is disposed in the lens frame and electrically connected to the signal transceiver module for displaying signals received by the signal transceiver module; wherein the power unit supplies power to the display lens and the signal transceiver module;

wherein the Hall sensor provides a first signal for the electronic device when the first temple and/or the second temple are folded to make the Hall sensor and the audio I/O device close to each other, and the Hall sensor provides a second signal for the electronic device when the first temple or the second temple are unfolded to make the Hall sensor and the audio I/O device be away from each other;

wherein the electronic device further comprises a touch button electrically connected to the display lens and the power unit, wherein the touch button generates control signal to change the image displayed on the display lens in response a user touch; and wherein the electronic device further comprises a camera unit electrically connected to the display lens, the power unit, the touch button and the signal transceiver module, wherein the touch button controls the operation of the camera unit and the image displayed on the display lens, and the signal transceiver module transmits image data provided by the camera unit in a wireless manner.

* * * * *